UNITED STATES PATENT OFFICE.

ENOCH T. FERNGREN, OF WASHINGTON, DISTRICT OF COLUMBIA.

REFRACTORY COMPOSITION.

1,324,546.  Specification of Letters Patent.  Patented Dec. 9, 1919.

No Drawing.  Application filed February 26, 1915. Serial No. 10,729.

*To all whom it may concern:*

Be it known that I, ENOCH T. FERNGREN, a citizen of Stockholm, Sweden, residing at Washington, District of Columbia, have invented certain new and useful Improvements in Refractory Compositions.

My invention relates to the composition and method of compounding a refractory material to be used in the production of crucibles, furnace linings, conduits and other receptacles, which are required to withstand a high temperature, while containing molten material, as metals or glass, for instance.

The objects of my invention are to provide a composition of materials, which when made up into a receptacle, will, at a high temperature, be cohesive and tenacious and so hard that the said receptacle will not lose its shape under high temperatures nor crack during changes of temperature, and which will offer very great resistance to the corrosive and erosive action of the molten material in contact therewith.

In selecting material for the formation of my composition, to be used for refractory receptacles, I have chosen to blend zirconium oxid with any of the usual combinations of refractory materials and their bonds. The zirconium oxid need not necessarily be chemically pure, but should be nearly so, say at least 85% pure, when used in my composition, and it should be practically free from oxid of iron and is preferable for use after it has been calcined or electrically fused.

In particular with regard to iron, care should be taken to eliminate the same, as it tends to metallize the zirconia in the furnace in the presence of a reducing atmosphere.

I use zirconium oxid in the composition to produce toughness and strength and for its properties of great resistance to chemical action, under high temperature and to make the receptacle much more durable, resisting devitrification, even when used in small quantities in the said compositions.

A magnesite and alumina refractory material will not have as much resistance to distortion and cracking, under changing temperatures, as will a refractory composition, containing zirconium oxid.

If zirconium oxid is used without previous burning, some slight shrinkage in the article, made thereof, will take place during the subsequent firing of the said articles or receptacles. For use in refractory articles, such as crucibles and glass containing pots, I make a composition of matter composed of calcined zirconium oxid, calcined or fused magnesite and a calcined high-grade alumina clay, of equal parts by weight, with a refractory bonding clay, preferably German pot clay, to act as a flux medium, in amounts equal to about 20 per cent. of the total weight of the composition.

If a more refractory composition is desired the amount of zirconium oxid is increased and that of alumina is decreased, as compared to the proportions above stated, for use, where the articles made thereof are subjected to mechanical as well as chemical action, as in spouts, funnels, nozzles and conduits surrounded by a high temperature.

An extremely highly refractory composition is made from zirconium oxid (in its raw mineral state) to which is added fifteen per cent. (by weight) bond and flux material, consisting of a high grade alumina clay, with a small addition of fused magnesia. This composition will have greater shrinkage during the burning and is liable to crack unless great care is taken in drying and handling the article after molding and preferably should receive two burnings, the first to be done in a kiln, at about 2500 F, after which it is allowed to cool slowly and thereafter exposed to a temperature of about 3600 F. The first burning should, under ordinary kiln methods, occupy about four days and the last burning, which secures a more complete vitrification should occupy about three hours within a blast furnace, gradually raising the temperature to a maximum, during the first two hours, thereafter allowing gradual cooling, while still within the furnace.

At the present time, such a composition as last described, will be found comparatively costly, on account of the large proportion of zirconium oxid used, which should preferably be as nearly chemically pure, as possible, for the best results in this high grade refractory composition.

For furnace linings, not in contact with the molten material, for mufflers, gas and blast furnaces, and fire bricks, a composition made of fifteen per cent. raw zirconium oxid, forty per cent. of calcined magnesite, twenty per cent. calcined alumina clay and twenty-five per cent. of a bonding clay, preferably high in silica, will be found very desirable. This composition can be fired in an ordinary kiln at about 2700 F. to 2900 F.

In the last mentioned composition, the zirconium oxid and the silica of the bonding clay, will combine and fuse with the alumina and magnesite ingredients and form an exceedingly tough and durable refractory body.

In a fused composition composed of a china clay compound, for porcelain, to which is added fifteen per cent. of raw zirconium oxid, about ninety-eight per cent. pure, and seven per cent. calcined magnesia, we have an exceedingly refractory tough and elastic porcelain body, especially non-conductive of electricity and which exposed to sudden temperature changes will not be liable to crack.

The magnesite referred to in the various compositions above described tends to equalize the softening point of the said compositions and bridges the relatively low melting point of alumina with the relatively high melting point of zirconium oxid, which is the highest of the three. The more or less intimate fusion of these materials, during the burning of the articles, composed of the said compositions, is enhanced by the presence of silica, and small portions of alkalis; the silica being present in varying proportions in each of the ingredients used in any of the above described compositions. As a special flux, to be added to the clay, without however increasing the percentage of clay in the composition, sodium zirconate is an agent to promote an incipient early stage of vitrifying action and cemented together of the materials used.

If the materials used in the above compositions are each in a finely ground or divided state, just previous to being mixed and combined, the best results will be obtained in the finished articles. However, in large and coarse articles, a portion of the composition should be in granular form previous to mixing with the bond, and forming the article. The granular portion being that which contains all except the bonding material.

The previously calcined and finely ground material is compacted together in a wet or dry state and thereafter fired at a high fusing temperature and after becoming cooled is crushed into granular form. To this granular portion is then added the same materials in a finely ground and mixed state. The finely ground materials may be either burnt or in a raw material state, however, the magnesite should be electrically fused or calcined previous to its being introduced in the mixture, whether to become a component of the granular portion or the finely ground and divided portion. The ratio of the granular to the fine ground portions, may vary according to the shapes, temperatures and uses to which the articles are to be put.

The bonding material may be mixed first with the finer ground portion in a ball mill, before being combined with the granular portion or it may be entered after the granular and inner portions have been mixed together and then the whole body mixed together in a wet state. This wet mixture is then allowed to dry to a condition suitable for the molding operation into articles to be subsequently fired.

The molding operation may be done by hand or performed under high pressure in steel molds when greater density is required. The wet mixture may be poured into plaster of Paris molds, of a size to compensate for the shrinkage to the desired size. The plaster of Paris molds greatly absorb the water, which results in the formation of a fairly compact article of uniform structure free from strain and stresses.

The addition of borax to any of the above compositions, as a flux, will promote the fusion of the ingredients at a lower temperature than without it.

Zirconium oxid, when introduced as above described, into a refractory mixture of magnesite and high-grade aluminous clay that have previously been reduced to a relatively non-shrinkable state by calcining or fusion, adds an element of toughness to the refractory composition when formed into an article which renders the article made therefrom less sensitive to injury from mechanical agencies. The different physical and chemical properties and the subamorphous or heterogeneous cell combination, which build up and compose the body of each grain or grit in the structure of the refractory article, and which grits are knitted together by a vitreous cement containing all the elements of the mixture in a more or less fused condition tends to produce a body wherein, under changing temperature conditions and structural strains, the expansion and contraction are equalized and absorbed by yielding adjustment between the denser and the more porous components.

The less intimate grouping and fusion of the different elements in the porous granular portion of the body produces an interlaced, elastic and mechanically durable structural reinforcement in the article formed from the composition, that opposes fractures and cracking and has no definite cleavage line. The addition of magnesite and zirconia to refractory compositions used in the production of glass melting pots and furnace blocks for glass melting tanks produces a composition that is more resistant to the dissolving chemical action of the silicates and the sodiums and to a large degree prevents discoloration of the glass in contact with the walls of the refractory container.

Having described my invention I claim:

1. A refractory composition consisting of zirconium oxid, calcined magnesite and alumina in equal parts with a clay flux bond.

2. The herein described composition of matter composed of aluminous clay substances with equal amounts calcined magnesite and zirconium oxid.

3. A refractory composition, consisting of granules of chemically combined alumina, zirconia and magnesia compacted and united with a semi-fused bond containing silica.

4. That composition of matter which is composed of aluminous clay substances in semi-fused combination with the oxids of zirconia and magnesia.

5. A refractory article composed of aluminum silicate, zirconia and magnesia in an intimate partly fused state.

6. The herein described method of increasing the stability and cohesiveness of a fire clay product by the addition of zirconium oxid and calcined magnesite to alumina and a refractory plastic clay before the production of the product stated.

7. The herein described method of producing a durable refractory body, which consists in combining magnesia and zirconia in a semi-fused state and reducing the compound thus produced to a granular form and recombining the said granules with a mixture of refractory aluminous clay and thereafter shaping the composition to a desirable form and firing the article so shaped under temperatures sufficiently high to produce vitreous bond between the granular portions in the article.

8. The method of producing a tough and durable refractory article, which consists in mixing finely divided previously heat treated zirconia, magnesia and alumina with a refractory clay, and fusing the material; thereafter granulating the fused product and agglutinating the thus produced granules with a plastic clay; thereafter shaping an article from the material thus produced, and drying the article, and thereafter firing the article so as to produce a semi-fused bond betwen the granular material therein.

ENOCH T. FERNGREN.

Witnesses:
G. T. Fox.
N. L. Cook.